United States Patent
Bilik et al.

(10) Patent No.: US 10,401,485 B2
(45) Date of Patent: Sep. 3, 2019

(54) METHOD TO RESOLVE INTERFERING TARGETS JOINTLY AT MULTIPLE DIMENSIONS

(71) Applicant: GM Global Technology Operations LLC, Detroit, MI (US)

(72) Inventors: Igal Bilik, Rehovot (IL); Alexander Pokrass, Bat Yam (IL); Oded Bialer, Petah Tivak (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 450 days.

(21) Appl. No.: 15/365,298

(22) Filed: Nov. 30, 2016

(65) Prior Publication Data
US 2018/0149738 A1    May 31, 2018

(51) Int. Cl.
| | |
|---|---|
| G01S 13/52 | (2006.01) |
| G01S 13/93 | (2006.01) |
| G01S 7/292 | (2006.01) |
| G01S 13/95 | (2006.01) |
| G01S 7/03 | (2006.01) |

(52) U.S. Cl.
CPC ............ G01S 13/52 (2013.01); G01S 7/2925 (2013.01); G01S 13/931 (2013.01)

(58) Field of Classification Search
CPC ....... G01S 13/52; G01S 7/2925; G01S 13/931
USPC ............................................................ 342/70
See application file for complete search history.

(56) References Cited

U.S. PATENT DOCUMENTS

| | | | | |
|---|---|---|---|---|
| 5,061,934 A | * | 10/1991 | Brown | G01S 13/5244 342/159 |
| 5,189,426 A | * | 2/1993 | Asbury | G01S 13/24 342/101 |
| 5,793,703 A | * | 8/1998 | Shippey | G01S 15/8904 367/7 |
| 5,978,646 A | * | 11/1999 | Weinberg | G01S 7/526 434/6 |
| 5,978,647 A | * | 11/1999 | Weinberg | G01S 7/52004 434/6 |
| 5,983,067 A | * | 11/1999 | Weinberg | G01S 7/52004 434/6 |
| 5,995,803 A | * | 11/1999 | Weinberg | G01S 7/52004 434/6 |

(Continued)

FOREIGN PATENT DOCUMENTS

| | | | | |
|---|---|---|---|---|
| WO | WO-2012154262 A2 | * | 11/2012 | G01S 7/03 |
| WO | WO-2015183830 A1 | * | 12/2015 | G01S 13/95 |

*Primary Examiner* — Timothy A Brainard
*Assistant Examiner* — Nuzhat Pervin
(74) *Attorney, Agent, or Firm* — Cantor Colburn LLP

(57) ABSTRACT

A system and method for resolving a first target from a second target by radar is disclosed. The system includes a transmitter for transmitting a source signal, a receiver for receiving first and second echo signals from reflection of the source signal from at least a first target and a second target, respectively. A processor is used to subtract the first echo signal from the composite signal to obtain a second generation of the second echo signal, subtract the second generation of the second echo signal from the composite signal to obtain a second generation of the first echo signal, and estimate a parameter value for the first target from the second generation of the first echo signal and a parameter value for the second target from the second generation of the second echo signal.

16 Claims, 4 Drawing Sheets

(56) References Cited

U.S. PATENT DOCUMENTS

| | | | | |
|---|---|---|---|---|
| 6,002,914 | A * | 12/1999 | Weinberg | G01S 7/52004 |
| | | | | 434/6 |
| 7,379,018 | B1 * | 5/2008 | Lohmeier | G01S 7/2925 |
| | | | | 342/159 |
| 9,019,150 | B2 * | 4/2015 | Alalusi | G01S 7/03 |
| | | | | 342/118 |
| 9,057,785 | B1 * | 6/2015 | Lee | G01S 13/95 |
| 9,297,888 | B2 * | 3/2016 | Lee | G01S 13/95 |
| 2006/0125682 | A1 * | 6/2006 | Kelly, Jr. | G01S 7/023 |
| | | | | 342/159 |
| 2012/0212366 | A1 * | 8/2012 | Alalusi | G01S 7/03 |
| | | | | 342/118 |
| 2014/0243679 | A1 * | 8/2014 | Thomas, III | A61B 8/12 |
| | | | | 600/463 |
| 2015/0198707 | A1 * | 7/2015 | Al-Alusi | G01S 7/03 |
| | | | | 342/127 |
| 2016/0011300 | A1 * | 1/2016 | Lee | G01S 13/95 |
| | | | | 342/127 |

* cited by examiner

METHOD TO RESOLVE INTERFERING TARGETS JOINTLY AT MULTIPLE DIMENSIONS

FIELD OF THE INVENTION

The subject invention relates to a system and method for distinguishing target signals from one another using radar and, in particular, to a method and system for jointly improving the resolution of multiple targets in a composite radar signal.

BACKGROUND

Automobiles and other vehicles have come to employ safety systems which include radar technologies for detecting a location of an object or target with respect to the vehicle so that a driver or collision-avoidance device can react accordingly. A radar system includes a transmitter for sending out a source signal and a receiver for receiving an echo or reflection of the source signal from the target. The received signal (the echo signal) is sampled at a selected sampling frequency and the sampled data points of the received signal are entered into a Fast Fourier Transform (FFT) in order to determine a dominant frequency of the reflected signal. Various parameters and dimensions of the target, which are determined from the dominant frequency, are then used to provide an echo signal representative of the target in a data cube.

Due to the time-limited nature of digital sampling techniques, the echo signal in the data cube is not a centralized point but instead displays a central peak with multiple side lobes. The presence of side lobes produces complications when attempting to distinguish multiple echo signals from one another. For example, when a first target and a second target are in close proximity of each other, a side lobe of a first echo signal (representative of the first target) can overlap a peak of a second echo signal (representative of the second target). When the first echo signal is much stronger or more intense than the second echo signal, the side lobe of the first echo signal can mask the presence of the second echo signal, or alter the appearance of the second echo signal, thereby making accurate determination of parameters for the second echo signal difficult. Similarly, the presence of the second echo signal alters the appearance of the first echo signal and makes it difficult to accurately determinate parameters for the first echo signal. Accordingly, it is desirable to correct for the effect of echo signals on one another in order to distinguish multiple target signals from each other.

SUMMARY OF THE INVENTION

In one exemplary embodiment of the invention, a method of resolving a first target from a second target in a radar system is disclosed. A composite signal is obtained, the composite signal including a first echo signal obtained by reflection of a source signal of the radar system from the first target and a second echo signal obtained by reflection of the source signal from the second target. The first echo signal is subtracted from the composite signal to obtain a second generation of the second echo signal. The second generation of the second echo signal is subtracted from the composite signal to obtain a second generation of the first echo signal. A parameter value is estimated for the first target from the second generation of the first echo signal and a parameter value is estimated for the second target from the second generation of the second echo signal.

In another exemplary embodiment of the invention, a radar system is disclosed. The radar system includes a transmitter for transmitting a source signal, a receiver for receiving echo signals from reflection of the source signal from at least a first target and a second target, and a processor. The processor is configured to obtain a composite signal including a first echo signal representative of the first target and a second echo signal representative of the second target, subtract a signal representative of the first echo signal from the composite signal to generate of a second generation of the second echo signal, subtract a signal representative of the second generation of the second echo signal from the composite signal to obtain a second generation of the first echo signal, and estimate a parameter value for the first target from the second generation of the first echo signal and a parameter value for the second target from the second generation of the second echo signal.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
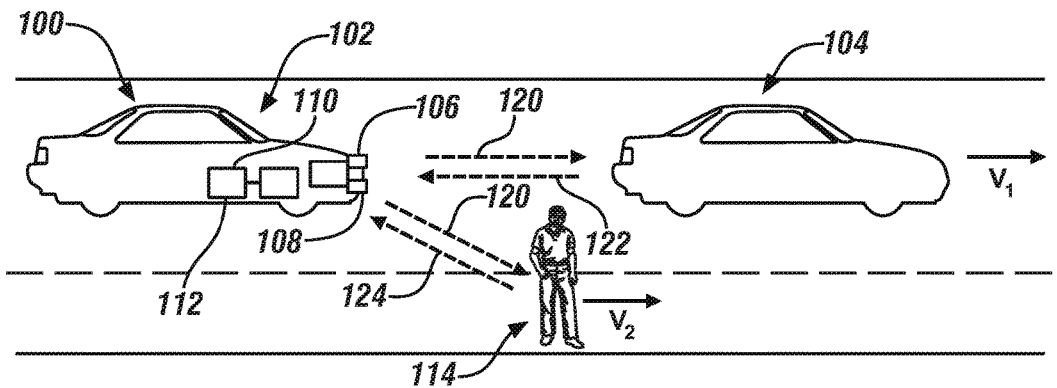
FIG. 1 shows a vehicle that includes a radar system suitable for determining a location and/or a relative velocity of various objects or targets with respect to the vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 shows a vehicle 100, such as an automobile, that includes a radar system 102 suitable for determining a location and/or a relative velocity of various objects or targets with respect to the vehicle 100. In the embodiment shown in FIG. 1, the radar system 102 includes a transmitter 106 and a receiver 108. In alternate embodiments, the radar system 102 may be a MIMO (multi-input, multi-output) radar system that includes an array of transmitters and an array of receivers. A control unit 110 on-board the vehicle 100 includes a processor which controls and operates the transmitter 106 to generate a radio frequency wave (a "source signal" 120). In one embodiment, the source signal 120 includes a linear frequency-modulated continuous wave (LFM-CW), often referred to as a chirp signal. Alternately, the source signal 120 can be a pulsed signal or a combination of pulsed and chirp signals. A first target 104 and a second target 114 are shown in a possible pathway of the vehicle 100. For illustrative purposes, the first target 104 is another vehicle that is at a first location with respect to the vehicle 100 and has a first relative velocity $v_1$ with respect to vehicle 100. The second target 114 is a person who is at a second location (i.e., on a walk path) with respect to the vehicle 100 and has a second relative velocity $v_2$ with respect to vehicle 100. A reflection of the source signal 120 from first target 104 provides a first echo signal 122, and a reflection of the source signal 120 from the second target 114 provides a second echo signal 124. The first echo signal 122 and second echo signal 124 are received at the receiver 108, which generally includes circuitry for sampling the first echo signal 122 and the second echo signal 124. The control unit 110 performs calculations on the first echo signal 122 and second echo signal 124 in order to determine locations and/or relative velocities of the first and second targets 104, 114 with respect to the vehicle 100. Knowledge of the location and/or the relative velocity of the first and second targets 104, 114 with respect to the vehicle 100 can then be used to maneuver the vehicle 100 by, for example, accelerating or decelerating the vehicle 100 or steering the vehicle 100 in order to avoid the first and second targets 104, 114. In one embodiment, the control unit 110 determines the distance and/or velocity of the first and second targets 104, 114 with respect to the vehicle 100 and may cooperate with a collision-avoidance system 112 to control steering and acceleration/deceleration components to perform necessary maneuvers at the vehicle 100 to avoid the first and second targets 104, 114. In another embodiment, the control unit 110 provides a signal to alert a driver of the vehicle 100 so that the driver can take a necessary action to avoid the first and second targets 104, 114.

While the radar system 102 is discussed herein as being on-board vehicle 100, the radar system 102 may also be part of an immobile or stationary object in alternate embodiments. Similarly, each of the first target 104 and second target 114 can be a vehicle or any type of moving object or can be an immobile or stationary object.

Figure 2:
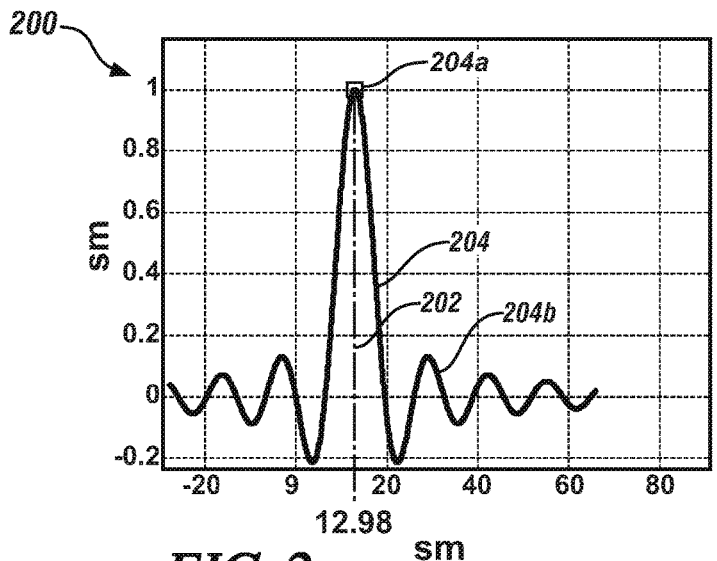
FIG. 2 shows an exemplary data space for a single echo signal obtained via a radar system for a single target.

FIG. 2 shows an exemplary data space 200 for a single echo signal obtained via a radar system for a single target. The echo signal is shown for illustrative purposes as a signal in one dimension. This dimension can be one of range (distance to target), azimuth, and elevation of velocity (i.e., relative velocity) of the target. The radar system however is capable of obtaining values of parameters in multiple dimensions, including some or all of range, azimuth, elevation and velocity. When parameter values are obtained in all four dimensions, the radar system generates a four-dimensional data cube in which to represent the echo signal. In the four-dimensional data cube, the echo signal is represented as a four-dimensional point. For illustrative purposes, FIG. 2 shows only a single dimension, that of range.

Data space 200 includes a time-delimited echo signal 202, i.e., an echo signal that is obtained over an infinite sampling time. The time-delimited echo signal 202 is characterized by a single peak centered at a selected parameter value in parameter space. The illustrative echo signal 202 is located at a range of 12.98 m. The height of the peak is indicative of the strength or intensity of the signal from the target. FIG. 2 also shows a time-limited echo signal 204. The time-limited echo signal 204 is characterized by a peak 204a centered at the location of the target (i.e., at 12.98 m) as well as various side lobes 204b. The intensity of the side lobes 204b is generally about 10 decibels less than the intensity of the peak 204a. The shape of the time-limited target signal 204 is due to there being a finite time period for sampling.

Figure 3:
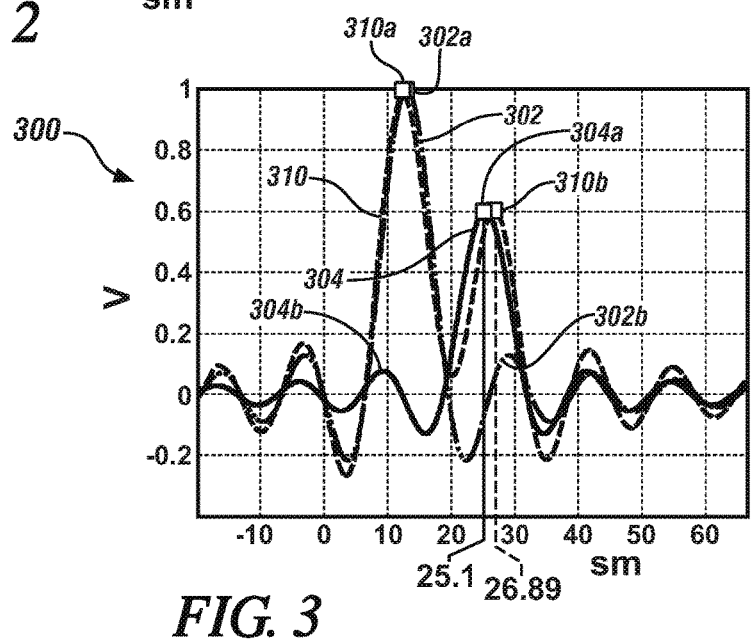
FIG. 3 shows an exemplary data space including two time-limited echo signals obtained from multiple targets.

FIG. 3 shows an exemplary data space 300 including two time-limited echo signals obtained from multiple targets. FIG. 3 shows a one-dimensional data space. However, as with FIG. 2, the radar system may present the echo signals of FIG. 3 as four-dimensional signals in a four-dimensional data cube when four parameters of the target have been measured. A first echo signal 302 is shown having a central peak 302a and side lobe 302b. A second echo signal 304 is shown having a central peak 304a and side lobe 304b. For illustrative purposes, the first echo signal 302 is caused by the first target 104 of FIG. 1 and the second echo signal 304 is caused by the second target 114 of FIG. 1. The first echo signal 302 is stronger or more intense than the second echo signal 304.

FIG. 3 also shows a composite signal 310 that represents the sum of the first echo signal 302 and the second echo signal 304. The composite signal 310 is the signal that is initially obtained at the radar system. The composite signal 310 exhibits two major composite peaks, 310a and 310b. First peak 310a in the composite signal 310 is a summation of peak 302a of the first echo signal 302 and side lobe 304b of the second echo signal 304. The value of the parameter (e.g. range) of peak 310a is different from the value of the parameter for peak 302a, generally due to the effects of the side lobe 304b. Second peak 310b in the composite signal 310 is a summation of peak 304a of the second target signal 304 and side lobe 302b of the first echo signal 302. Peak 310b is offset from peak 304a due to the effects of the side lobe 302b. For an example, peak 304a is located at 25.1 sm and peak 310b is located at 26.89 sm, for a difference of 1.79 sm. The method disclosed herein provides a method of determining the parameter values for peak 302a of the first signal 302 and peak 304a of the second signal 304 from the composite signal 310. This method can be extended to four parameter dimensions as well as to the presence of multiple target signals within a four-dimensional data cube.

Figure 4:
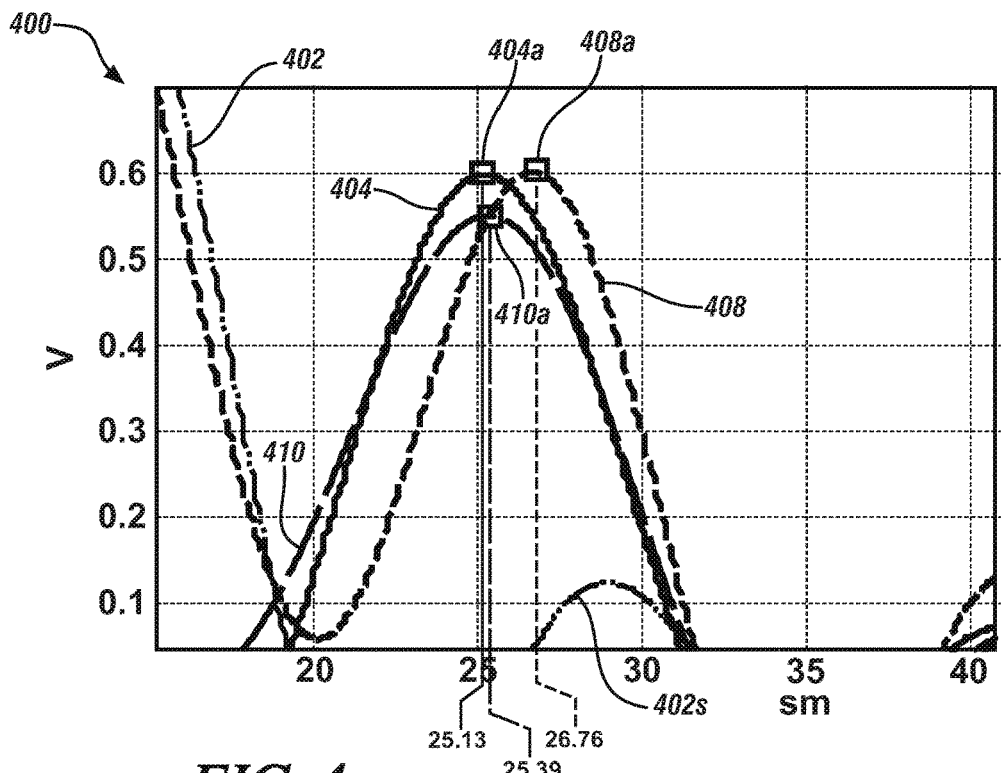
FIG. 4 shows a data space illustrating the results of applying the method disclosed herein in obtaining a parameter value representative of an original echo signal from the composite signal.

FIG. 4 shows a data space 400 illustrating the results of applying the method disclosed herein in obtaining a parameter value representative of an original echo signal from the composite signal. The data space 400 shows only a single dimension, which is selected as range for illustrative purposes only. The composite signal 408 includes first echo signal 402 and a second echo signal 404. The data space 400 shows a close-up in a region of a peak 404a of the second echo signal 404. The data space 400 shows a portion of a central lobe of the first echo signal 402 and a first side lobe 402s of the first echo signal 402. The data space 400 also shows peak 408a of the component signal 408. Due to the strength of the side lobe 402s, an estimated value of range for the peak 408a is significantly different that the estimated value of range for peak 404a. In particular, peak 408a is located at 26.76 sm, while peak 404a is located at 25.13 sm for an error of about 6.4%

Curve 410 represents a remaining or residual signal that results from subtracting the first signal 402 from the composite signal 408. It is clear that the peak 410a of residual signal 410 has moved along the x-axis and is more closely aligned (along the x-axis) with peak 404a than is the peak 408a. In particular, peak 410a is located at 25.39 sm while peak 504a is located at 25.13 sm, for an error of about 0.95%. Therefore, the accuracy with which one is able to determine the peak 404a of the second echo signal 404, as well as its parameter value(s), is increased by subtracting out the first echo signal 402 and its side lobes from the composite signal 408. This method similarly can be applied to subtract out the second echo signal 404 from the composite signal 408 in order to obtain an improved representation of the first echo signal 402.

Figure 5:
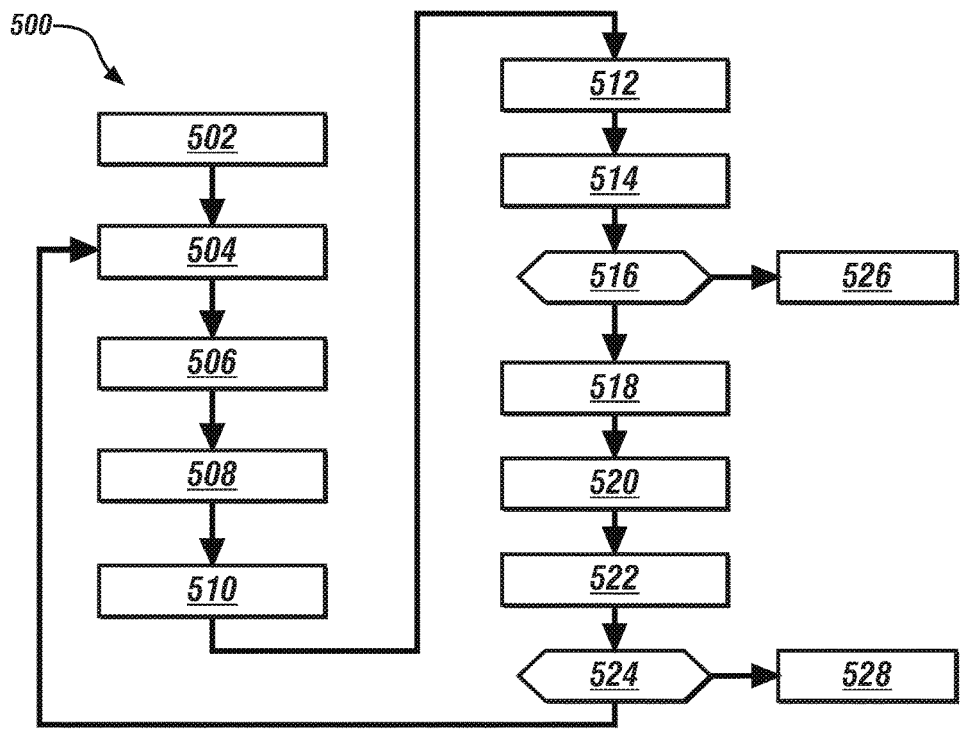
FIG. 5 shows a flowchart illustrating the method for peak resolution disclosed herein.

FIG. 5 shows a flowchart 500 illustrating the method for peak resolution disclosed herein. The method is an iterative method for determining parameter values for the first echo signal and the second echo signal in a composite signal composed of the first and second echo signals to within a selected criterion. The method alternately subtracts signals representative of the first and second echo signals from the original composite signal in order to bring parameter values of the echo signals in line with the actual parameter values of their corresponding targets. Since the process is an iterative process, we used the terms "first generation," "second generation," etc. to described the results of each iteration, whereas the first generation of the first echo signal is the original first echo signal and the first generation of the second echo signal is the original second echo signal. However, it is to be understood that multiple echo signals can occur in a composite signal and that the methods disclosed herein can be extended to include these multiple echo signals. The method of FIG. 5 can be performed on a processor, such as the processor of control unit 110.

In box 502, the method begins with a composite signal that includes both the first generation of the first echo signal and the first generation of the second echo signal, the peaks (i.e., local maxima) are located for the composite signal.

In box 504 a peak for the first generation of the first echo signal is identified in the composite signal and in box 506 a parameter value (e.g., a value along the x-axis) is determined for the peak of the first generation of the first echo signal. In box 508, a representative signal is constructed for the first generation of the first echo signal using the parameter value from box 506. In one embodiment, constructing the representative signal includes constructing a sinc function having a central peak located at the parameter value. The sinc function can be constructed from a convolution of a delta function having the parameter value for the peak of the signal to be represented.

In box 510, the representative signal from box 508 is subtracted from the composite signal to obtain a first residual signal. The first residual signal includes a peak for a second generation of the second echo signal.

In box 512, the peak for the second generation of the second echo signal is identified and in box 514 a parameter value is determined for the peak from box 512. Once the parameter value is determined at box 514, the flowchart can perform a decision step at box 516 in which the parameter value for a current generation (e.g., the second generation) of the second echo signal is compared to the parameter value for the previous generation (e.g., the first generation) of the second echo signal. When the difference between the current and previous parameter values is less than a selected threshold value, the method comes to a stop (box 526). Otherwise, the method continues to box 518.

In box 518, a representative signal is constructed for the second generation of the second echo signal using the determined parameter value from box 514. Constructing the representative signal includes providing a sinc function having a central peak located at the parameter value. In box 520, the representative signal from box 518 is subtracted from the composite signal (i.e., the original composite signal from box 502) to obtain a second residual signal. The second residual signal includes a peak for a second generation of the first echo signal. In box 522, a parameter for the second generation of the first echo signal is determined.

Once the parameter value is determined at box 522, the flowchart performs a decision step at box 524 in which the parameter value for the current generation of the first echo signal is compared to the parameter value for the previous generation of the first echo signal. When the difference between the current and previous parameter values is less than a selected threshold, the method may come to a stop (box 528). Otherwise, the method continues to determine a next generation of echo signal by returning to box 504.

The second generations of the first echo signal and the second echo signals are considered to be more realistic representatives of their respective targets than the first generation of the respective signals. When the difference between the parameter values of successive generations is less than a selected criterion, the parameter value is considered to have converged and the method can stop. Otherwise, the method continues onto a next iteration. While the decision to stop or continue has been described either by comparing parameter values for consecutive generations of the first echo signal (box 524) or by comparing parameter values for consecutive generations of the second echo signal (box 516), the method may stop when the differences in parameter values for consecutive generations of both the first echo signal and the second echo signal are less than their respective threshold values.

Figure 6:
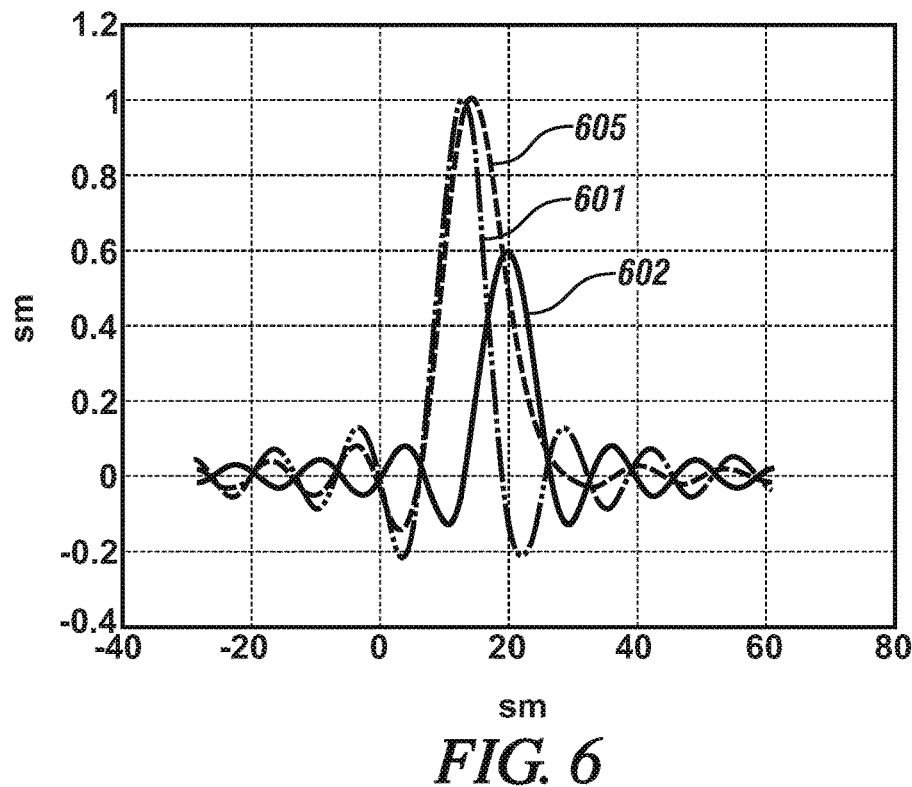
FIG. 6 shows a first generation of a first echo signal, a first generation of a second echo signal and a composite signal.
Figure 7:
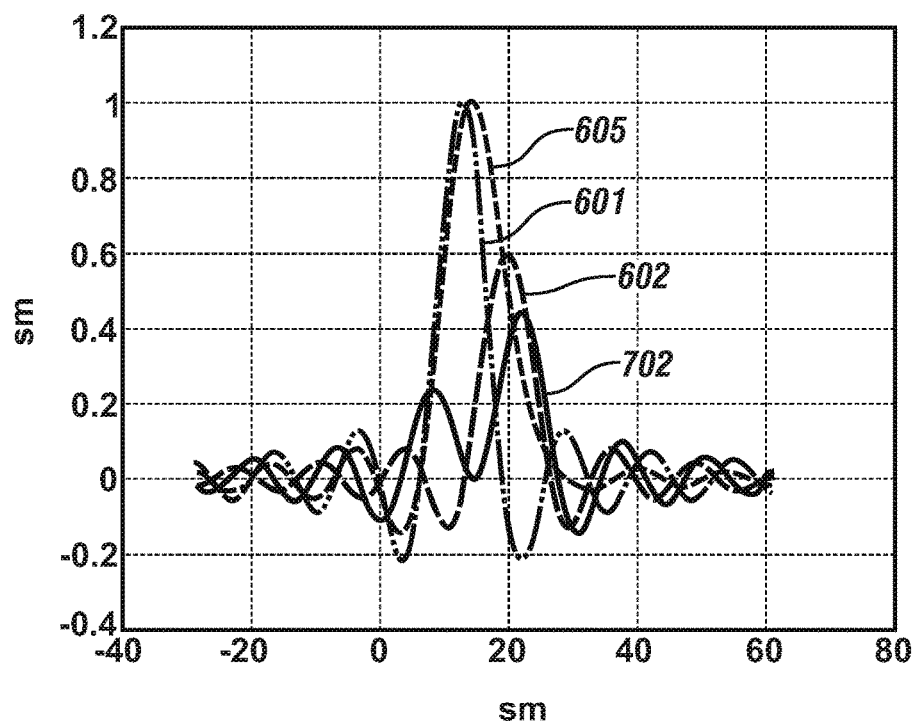
FIG. 7 shows the signals of FIG. 6 and a second generation of the second echo signal obtained using the method disclosed herein.
Figure 8:
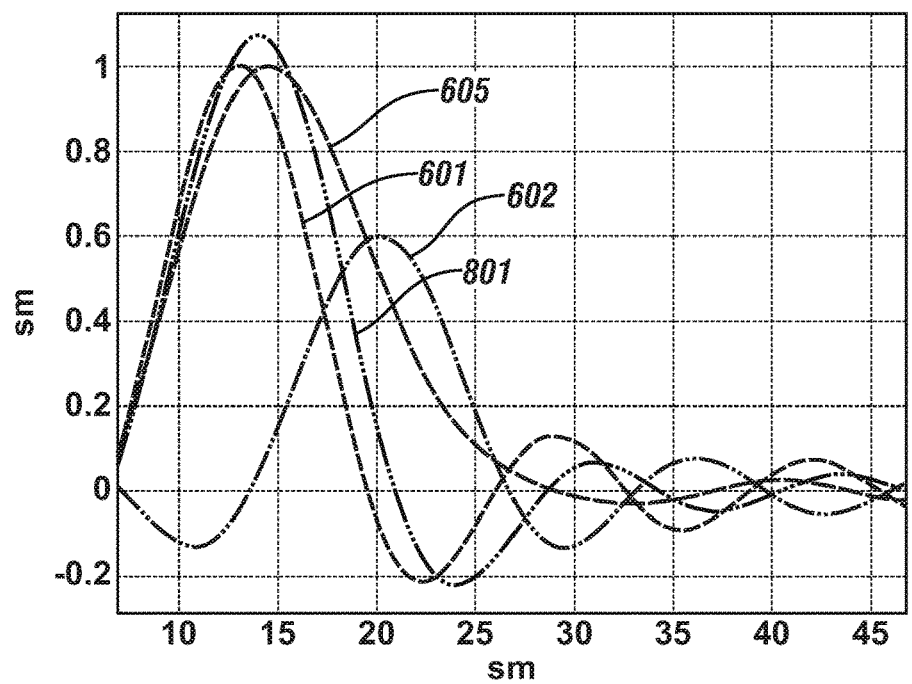
FIG. 8 shows the signals of FIG. 6 and a second generation of a first echo signal obtained using the method disclosed herein.

FIGS. 6-9 illustrate signals obtained using the method disclosed in the flowchart 500. FIG. 6 shows a first generation of a first echo signal 601, a first generation of a second echo signal 602 and a composite signal 605. FIG. 7 shows the signals of FIG. 6 and a second generation of the second echo signal 702 obtained using the method disclosed herein, such as at box 510 of FIG. 5. FIG. 8 shows the signals of FIG. 6 and a second generation of a first echo signal 801 obtained using the method disclosed herein, such as at box 520 of FIG. 5.

Figure 9:
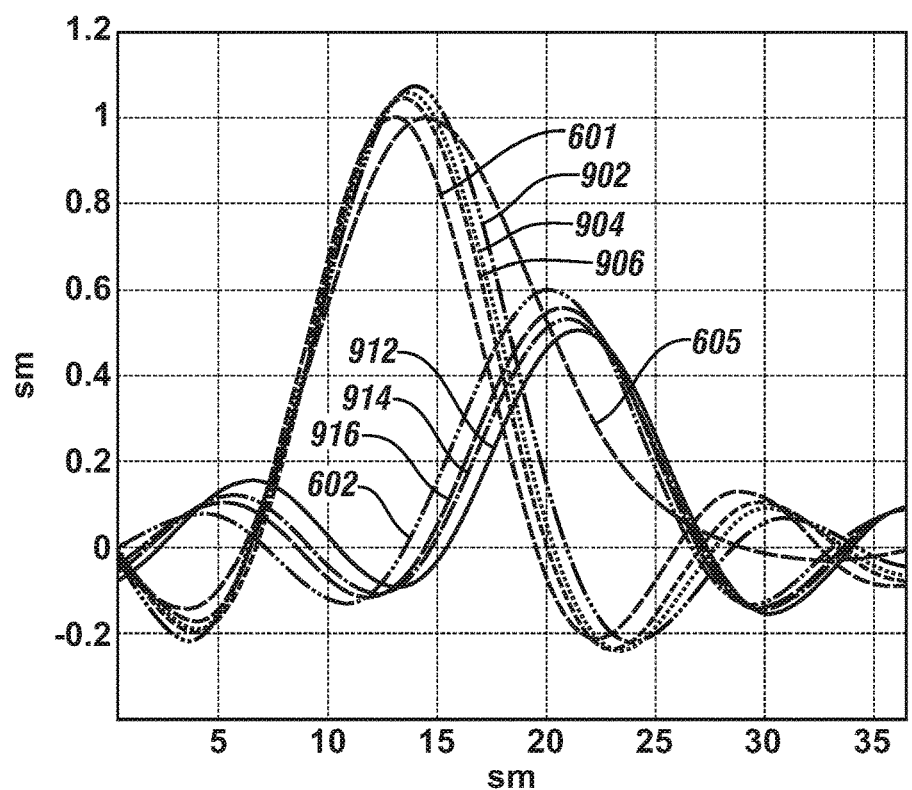
FIG. 9 shows multiple generations of the first and second echo signals obtained via multiple iterations of the method disclosed herein.

FIG. 9 shows multiple generations of the first and second echo signals obtained via multiple iterations of the method disclosed herein. First generation of the first echo signal 601, first generation of the second echo signal 602 and composite signal 605 are shown, as well as second (902), third (904) and fourth (906) generations of the first echo signal and second (912), third (914) and fourth (916) generations of the second echo signal.

The methods disclosed herein improve the ability of a radar system to distinguish multiple target signals from each other and to more accurately determine the values of parameters associated with the multiple target signals, such as their range, elevation, azimuth, relative velocity. These improved parameter values can be provided to the driver or the collision avoidance system (112, FIG. 1) in order for the driver or the collision avoidance system 112 to have improved reaction in avoiding targets, thus increasing a safety of the driver and vehicle.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of resolving a first target from a second target in a radar system, comprising:
   obtaining a composite signal including a first echo signal obtained by reflection of a source signal of the radar system from the first target and a second echo signal obtained by reflection of the source signal from the second target;
   subtracting the first echo signal from the composite signal to obtain a second generation of the second echo signal;
   subtracting the second generation of the second echo signal from the composite signal to obtain a second generation of the first echo signal; and
   estimating a parameter value for the first target from the second generation of the first echo signal and a parameter value for the second target from the second generation of the second echo signal.

2. The method of claim 1, wherein subtracting the first echo signal further comprises identifying the first echo signal in the composite signal, creating a signal representative of the first echo signal and subtracting the signal representative of the first echo signal from the composite signal to obtain the second generation of the second echo signal.

3. The method of claim 2, wherein subtracting the second generation of the echo signal further comprises creating a signal representative of the second echo signal and subtracting the signal representative of the second echo signal from the composite signal to obtain the second generation of the first echo signal.

4. The method of claim 3, wherein the signal representative of the first echo signal and the signal representative of the second echo signal are sinc functions.

5. The method of claim 3, wherein constructing the signal representative of the first echo signal and the signal representative of the second echo signal further comprises performing a convolution of a delta function having the parameter values of peaks of the first and second echo signals, respectively.

6. The method of claim 1, further comprising iterating the process of subtracting peaks to obtain a subsequent generation of peaks.

7. The method of claim 6, further comprising continuing the iteration until a difference between a parameter value for a current generation of an echo signal and a parameter value for a previous generation of the echo signal is less than a selected threshold value.

8. The method of claim 1, further comprising driving a vehicle using at least one of: (i) the parameter value for the first target obtained from the second generation of the first echo signal; and (ii) the parameter value for the second target obtained from the second generation of the second echo signal.

9. A radar system, comprising:
   a transmitter for transmitting a source signal;
   a receiver for receiving echo signals from reflection of the source signal from at least a first target and a second target; and
   a processor configured to:
   obtain a composite signal including a first echo signal representative of the first target and a second echo signal representative of the second target;
   subtract a signal representative of the first echo signal from the composite signal to generate of a second generation of the second echo signal;
   subtract a signal representative of the second generation of the second echo signal from the composite signal to obtain a second generation of the first echo signal; and
   estimate a parameter value for the first target from the second generation of the first echo signal and a parameter value for the second target from the second generation of the second echo signal.

10. The radar system of claim 9, wherein the processor is further configured to identify the first echo signal in the composite signal, create a signal representative of first echo signal and subtract the signal representative of the first echo signal from the composite signal to obtain the second generation of the second echo signal.

11. The radar system of claim 10, wherein the processor is further configured to create a signal representative of the second echo signal and to subtract the signal representative of the second echo signal from the composite signal to obtain the second generation of the first echo signal.

12. The radar system of claim 11, wherein the signal representative of the first echo signal and the signal representative of the second echo signal are sinc functions.

13. The radar system of claim 11, wherein creating the signal representative of the first echo signal and the signal representative of the second echo signal further comprises performing a convolution of a delta function having the parameter values of peaks of the first and second echo signals, respectively.

14. The radar system of claim 9, wherein the processor is further configured to iterate the process of subtracting echo signals to obtain a subsequent generation of echo signals.

15. The radar system of claim 14, wherein the processor is further configured to continue the iteration until a difference between a parameter value for a current generation of an echo signal and a parameter value for a previous generation of the echo signal is less than a selected threshold value.

16. The radar system of claim 9, further comprising a collision-avoidance device for driving a vehicle using at least one of: (i) the parameter value for the first target obtained from the second generation of the first echo signal; and (ii) the parameter value for the second target obtained from the second generation of the second echo signal.

* * * * *